(12) United States Patent
Tsuru et al.

(10) Patent No.: US 11,384,644 B2
(45) Date of Patent: Jul. 12, 2022

(54) COOLING STRUCTURE FOR TURBINE AIRFOIL

(71) Applicant: KAWASAKI JUKOGYO KABUSHIKI KAISHA, Kobe (JP)

(72) Inventors: Tomoko Tsuru, Akashi (JP); Katsuhiko Ishida, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 19 days.

(21) Appl. No.: 16/558,706

(22) Filed: Sep. 3, 2019

(65) Prior Publication Data

US 2020/0018173 A1 Jan. 16, 2020

Related U.S. Application Data

(63) Continuation of application No. PCT/JP2018/008645, filed on Mar. 6, 2018.

(30) Foreign Application Priority Data

Mar. 10, 2017 (JP) .............................. JP2017-045927

(51) Int. Cl.
  *F01D 5/18* (2006.01)
  *F02C 7/18* (2006.01)
  (Continued)

(52) U.S. Cl.
  CPC ............... *F01D 5/187* (2013.01); *F01D 5/18* (2013.01); *F01D 5/186* (2013.01); *F01D 5/188* (2013.01);
  (Continued)

(58) Field of Classification Search
  CPC .......... F01D 9/065; F01D 5/186; F01D 5/187; F01D 5/188; F05D 2260/20;
  (Continued)

(56) References Cited

U.S. PATENT DOCUMENTS 4,407,632 A * 10/1983 Liang ..................... F01D 5/187
                                                                  415/115
5,603,606 A    2/1997 Glezer et al.
(Continued)

FOREIGN PATENT DOCUMENTS

| CN | 105308268 A | 2/2016 |
|----|-------------|--------|
| JP | 4957131 B2 | 6/2012 |
| WO | 2014/200871 A1 | 12/2014 |

*Primary Examiner* — Christopher Verdier
(74) *Attorney, Agent, or Firm* — Sughrue Mion, PLLC (57) ABSTRACT

A structure for cooling a turbine airfoil includes: a cooling passage formed between a first airfoil wall curved as to be concave relative to a high-temperature gas passage and a second airfoil wall curved so as to be convex relative to the high-temperature gas passage; lattice structure bodies each formed by stacking a plurality of ribs in a lattice pattern; a partition body provided between the adjacent lattice structure bodies; a cooling medium discharge port for discharging a cooling medium within the cooling passage to the outside; and an exposed wall portion formed as a portion of the second airfoil wall extending beyond the cooling medium discharge port to the outside. At outlet portions of the lattice structure bodies adjacent to each other across the partition body, adjacent first rib sets and second rib sets are inclined in opposite directions relative to the partition body, respectively.

4 Claims, 6 Drawing Sheets

(51) Int. Cl.
    *F01D 25/12*     (2006.01)
    *F01D 9/06*     (2006.01)

(52) U.S. Cl.
    CPC ............. *F01D 9/065* (2013.01); *F01D 25/12* (2013.01); *F02C 7/18* (2013.01); *F05D 2260/2212* (2013.01); *F05D 2260/22141* (2013.01)

(58) Field of Classification Search
    CPC ......... F05D 2260/201; F05D 2260/202; F05D 2260/22141; F05D 2260/2212; F02C 7/18
    See application file for complete search history.

(56) References Cited

U.S. PATENT DOCUMENTS

| | | | |
|---|---|---|---|
| 9,464,528 B2 | 10/2016 | Zhang et al. | |
| 10,598,027 B2 * | 3/2020 | Bregman | F28F 13/08 |
| 2013/0121839 A1 * | 5/2013 | Batt | F01D 5/288 |
| | | | 416/241 R |
| 2014/0328669 A1 * | 11/2014 | Bregman | F01D 5/187 |
| | | | 415/115 |
| 2014/0369852 A1 | 12/2014 | Zhang et al. | |
| 2016/0003549 A1 * | 1/2016 | Fujimoto | F02C 7/18 |
| | | | 165/164 |
| 2016/0169003 A1 | 6/2016 | Wong et al. | |

\* cited by examiner

COOLING STRUCTURE FOR TURBINE AIRFOIL

CROSS REFERENCE TO THE RELATED APPLICATION

This application is a continuation application, under 35 U.S.C. § 111(a), of international application No. PCT/JP2018/008645, filed Mar. 6, 2018, which claims priority to Japanese patent application No. 2017-045927, filed Mar. 10, 2017, the disclosure of which are incorporated by reference in their entirety into this application.

BACKGROUND OF THE INVENTION

Field of the Invention

The present invention relates to a structure for cooling a turbine airfoil of a gas turbine engine, that is, a stator vane and a rotor blade in a turbine.

Description of Related Art

A turbine that forms a part of a gas turbine engine is disposed downstream of a combustor and high-temperature gas burnt in the combustor is supplied to the turbine. Thus, the turbine is exposed to high temperatures during operation of the gas turbine engine. Therefore, it is necessary to cool a stator vane and a rotor blade of the turbine. As a structure for cooling such a turbine airfoil, it has been known to introduce part of air compressed by a compressor into a cooling passage formed in the airfoil and cool the turbine airfoil using the compressed air as a cooling medium (see, for example, Patent Document 1).

In the case of using part of the compressed air to cool the turbine airfoil, it is not necessary to introduce a cooling medium from the outside, so that there is a merit that the cooling structure can be simplified. However, when a large amount of air compressed by the compressor is used for cooling, it leads to a reduction in engine efficiency. Thus, it is necessary to efficiently perform cooling with as little air as possible. As a structure for cooling a turbine airfoil with high efficiency, use of a so-called lattice structure body formed by combining a plurality of ribs in a lattice pattern has been proposed (see, for example, Patent Document 2). In the lattice structure body, a cooling medium is collided against the ribs, which form the lattice structure body, to generate vortex flow, whereby the cooling efficiency is enhanced.

Meanwhile, as a structure for discharging a cooling medium within a turbine airfoil through an airfoil rear edge portion, causing a cooling medium to flow along a back surface of an airfoil wall at the suction surface side exposed by cutting out an airfoil wall at the pressure surface side of a turbine airfoil rear edge portion, thereby performing film cooling of the back surface, has been proposed (see Patent Document 2).

RELATED DOCUMENT

Patent Document

[Patent Document 1] U.S. Pat. No. 5,603,606
[Patent Document 2] JP Patent No. 4957131

SUMMARY OF THE INVENTION

However, in the case where film cooling of the blade rear edge portion is combined with the lattice structure body as disclosed in Patent Document 2, intense vortex flow coming out of the lattice structure body is discharged to an exposed wall surface and becomes caught in high-temperature gas flowing outside. As a result, it is difficult to sufficiently obtain a cooling effect by the film cooling.

Therefore, in order to solve the above-described problem, an object of the present invention is to provide a cooling structure that is able to cool the entirety of a turbine airfoil with high efficiency by cooling the interior of the turbine airfoil with high efficiency by a lattice structure body and also effectively cooling a turbine airfoil rear edge portion by film cooling.

In order to achieve the above-described object, a cooling structure for a turbine airfoil according to the present invention is a structure for cooling a turbine airfoil of a turbine driven by high-temperature gas, the structure including:

a cooling passage formed between a first airfoil wall of the turbine airfoil that is curved so as to be concave relative to a passage for the high-temperature gas and a second airfoil wall of the turbine airfoil that is curved so as to be convex relative to the passage for the high-temperature gas;

a plurality of lattice structure bodies each including a first rib set composed of a plurality of first ribs extending linearly and provided on a wall surface of the first airfoil wall that faces the cooling passage, and a second rib set composed of a plurality of second ribs extending linearly and provided on a wall surface of the second wall that faces the cooling passage, the second rib set being stacked on the first rib set so as to form a lattice pattern;

a partition body provided between the adjacent two lattice structure bodies and configured to close a passage formed in each rib set;

a cooling medium discharge port provided at a downstream end portion of the cooling passage and configured to discharge the cooling medium within the cooling passage to the outside; and an exposed wall portion in the form of a portion of the second airfoil wall extending beyond the cooling medium discharge port to the outside;

in which at at least respective outlet portions of the two lattice structure bodies adjacent to each other with the partition body being interposed therebetween, the adjacent two first rib sets and the adjacent two second rib sets are inclined in opposite directions relative to the partition body, respectively.

According to this configuration, the cooling medium discharged as vortex flow from the lattice structure body and the cooling medium that has been discharged from the adjacent lattice structure body and has formed vortex flow in opposite directions interfere with each other, whereby the vortex flows cancel each other and the cooling medium is straightened to flow in a uniform direction and then discharged from the cooling medium discharge port to the exposed wall portion. Accordingly, the high-temperature gas and the cooling medium are inhibited from being mixed together at the exposed wall portion, and a sufficient film cooling effect is obtained. Therefore, both cooling of the interior of the turbine airfoil by the lattice structure body and film cooling of the turbine airfoil rear edge portion can be achieved with high efficiency, and thus it is possible to enhance the cooling efficiency for the entirety of the turbine airfoil.

In one embodiment of the present invention, at at least the respective outlet portions of the two lattice structure bodies adjacent to each other with the partition body being interposed therebetween, the adjacent two first rib sets and the adjacent two second rib sets are inclined so as to be symmetrical with respect to the partition body, respectively. According to this configuration, vortex flows of the cooling media discharged from the adjacent lattice structure bodies more effectively cancel each other, and thus film cooling of the turbine airfoil rear edge portion can be performed with high efficiency by the very uniformly straightened cooling medium.

In one embodiment of the present invention, an outlet of each lattice structure body may be located at the cooling medium discharge port. According to this configuration, after the entirety of the interior of the cooling passage is effectively cooled by the lattice structure bodies, film cooling of the rear end portion of the turbine airfoil can be performed by uniform flow of the cooling medium. Therefore, it is possible to further enhance the cooling efficiency for the entirety of the turbine airfoil.

In one embodiment of the present invention, a movement direction of the entirety of the cooling medium may be a direction along a chord of the turbine airfoil, and the plurality of the lattice structure bodies may be disposed so as to be arranged along a height direction of the turbine airfoil with the partition body interposed therebetween. Since the movement direction of the entirety of the cooling medium is the chord direction, the exposed wall portion can assuredly have sufficient dimension in the height direction of the turbine airfoil, and thus the cooling efficiency for the entirety of the turbine airfoil can be further enhanced.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
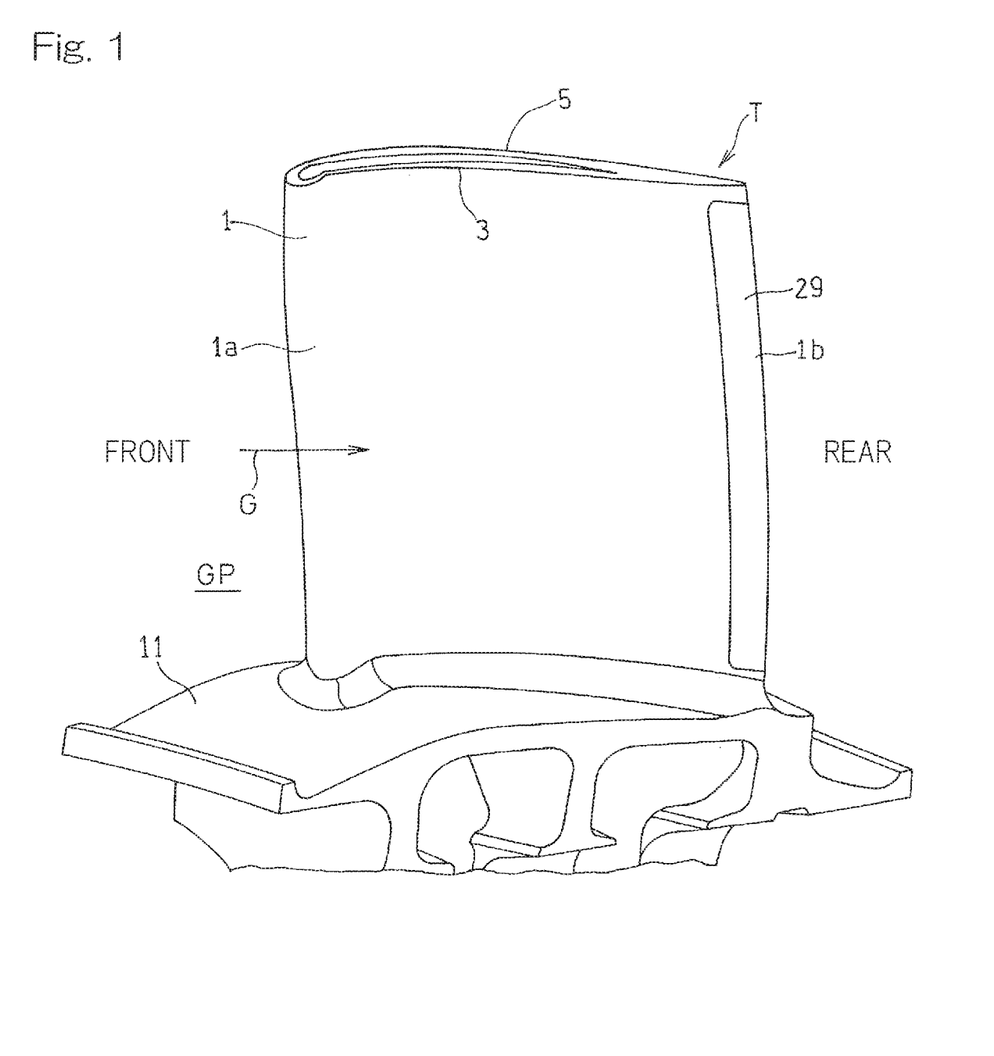
FIG. 1 is a perspective view showing an example of a turbine airfoil to which a cooling structure according to an embodiment of the present invention is applied.

Hereinafter, embodiments of the present invention will be described with reference to the drawings. FIG. 1 is a perspective view showing a rotor blade 1 of a turbine of a gas turbine engine to which a cooling structure for a turbine airfoil according to an embodiment of the present invention is applied. The turbine rotor blade 1 forms a part of a turbine T that is driven by high-temperature gas G, flowing in an arrow direction, which is supplied from a combustor that is not shown. The turbine rotor blade 1 has: a first airfoil wall 3 on the belly side that is curved so as to be concave relative to a passage GP for the high-temperature gas G; and a second airfoil wall 5 on the back side that is curved so as to be convex relative to the passage GP for the high-temperature gas. In the present specification, the upstream side along the flow direction of the high-temperature gas G (the left side in FIG. 1) is referred to as a front side, and the downstream side (the right side in FIG. 1) is referred to as a rear side. In the following description, the turbine rotor blade 1 is mainly described as an example of a turbine airfoil to which the cooling structure is provided, but the cooling structure according to the present embodiment may be similarly applied to a turbine stator vane that is a turbine airfoil, unless particularly described otherwise.

Figure 2:
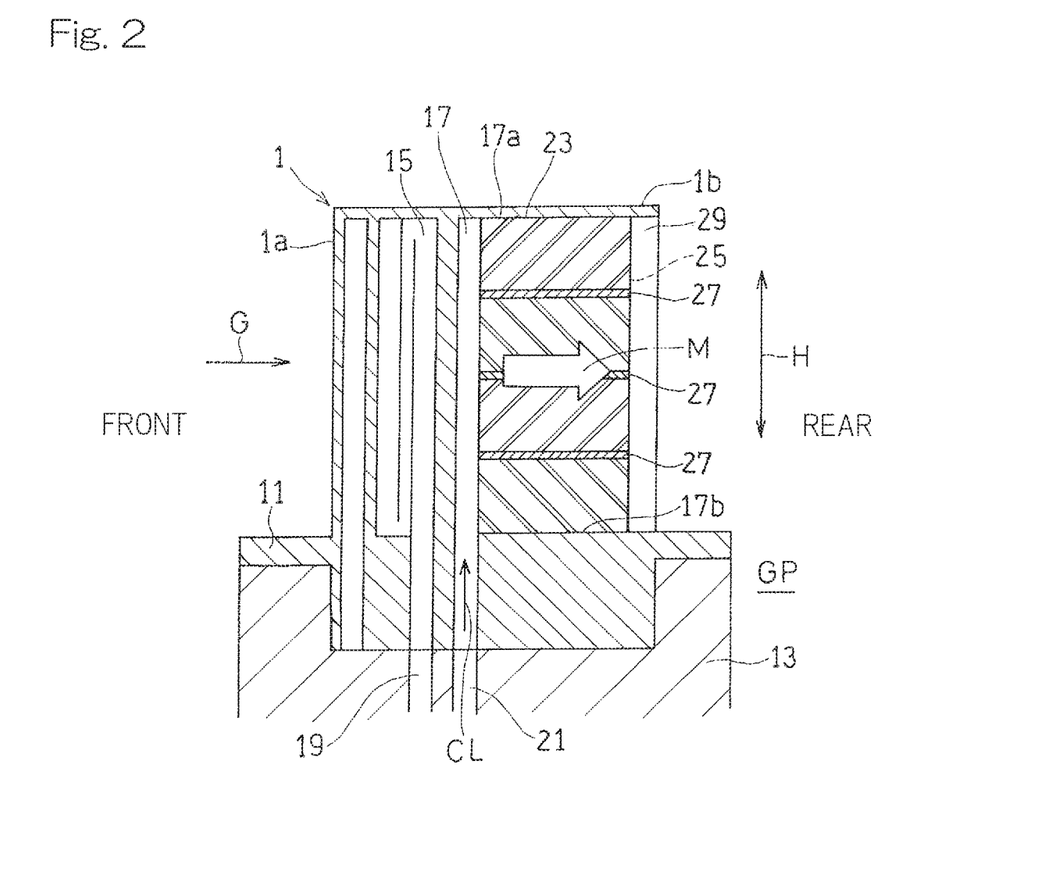
FIG. 2 is a longitudinal cross-sectional view schematically showing the turbine airfoil in FIG. 1.
Figure 3:
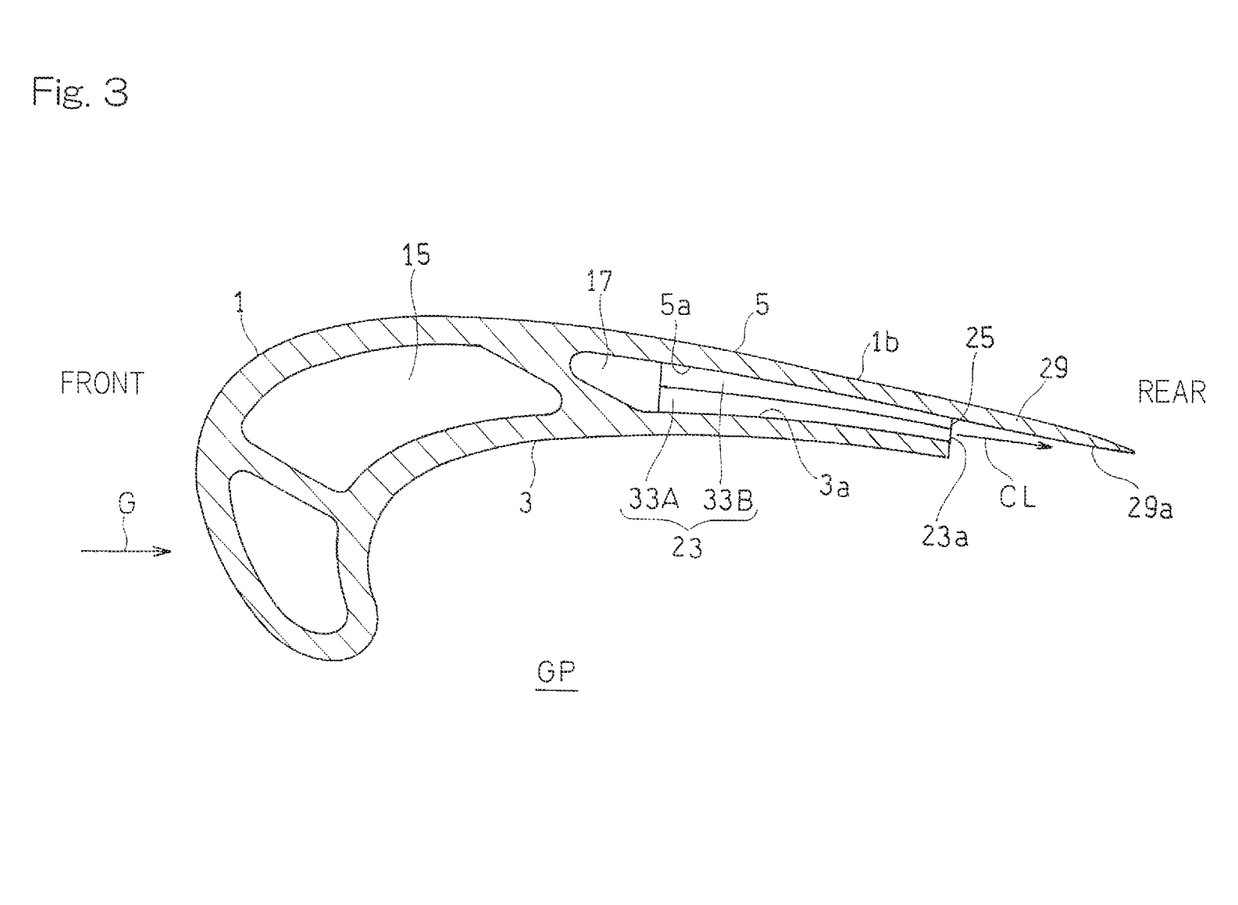
FIG. 3 is a transverse cross-sectional view of the turbine airfoil in FIG. 1.

Specifically, a large number of turbine rotor blades 1 are provided in a circumferential direction in an embedded manner such that, as shown in FIG. 2, a platform 11 of each turbine rotor blade 1 is connected to an outer circumferential portion of a turbine disc 13, whereby the turbine T is formed. A front cooling passage 15 is formed within a front portion 1a of the turbine rotor blade 1 so as to extend in a blade height direction H and turn back. A rear cooling passage 17 is formed within a rear portion 1b of the turbine rotor blade 1. These cooling passages 15 and 17 are formed by using a space between the first airfoil wall 3 and the second airfoil wall 5 as shown in FIG. 3.

As shown in FIG. 2, a cooling medium CL flows through a front cooling medium introduction passage 19 and a rear cooling medium introduction passage 21, which are formed within the turbine disc 13 at the radially inner side, toward the radially outer side, and is introduced into the front cooling passage 15 and the rear cooling passage 17, respectively. In the present embodiment, a part of compressed air from a compressor that is not shown is used as the cooling medium CL. The cooling medium CL supplied to the front cooling passage 15 is discharged to the outside through a cooling medium discharge hole that communicates with the outside of the turbine rotor blade 1 and that is not shown. The cooling medium CL supplied to the rear cooling passage 17 is discharged through a later-described cooling medium discharge port 25 to the outside. Hereinafter, an example in which the cooling structure according to the present embodiment is provided to only the rear portion 1b of the turbine rotor blade 1 will be described. However, the cooling structure according to the present embodiment may be provided in any region of the turbine rotor blade 1 that includes the rear portion 1b.

A lattice structure body 23 is provided within the rear cooling passage 17, as one element that forms a part of the cooling structure for cooling the turbine rotor blade 1. Each lattice structure body 23 internally cools the turbine rotor blade 1 by bringing the cooling medium CL into contact with ribs provided upright on each of wall surfaces of the first airfoil wall 3 and the second airfoil wall 5 that face the rear cooling passage 17, or by colliding the cooling medium CL against the ribs. In the following description, the wall surface of the first airfoil wall 3 that faces the rear cooling passage 17 is referred to as a first wall surface 3a, and the wall surface of the second airfoil wall 5 that faces the rear cooling passage 17 is referred to as a second wall surface 5a.

In the present embodiment, in the rear cooling passage 17, the entirety of the cooling medium CL flows in a direction traversing the lattice structure body 23 from the front side to the rear side. In the following description, the movement direction of the entirety of the cooling medium CL is referred to as a cooling medium movement direction M.

In the present embodiment, a plurality of (four in the shown example) lattice structure bodies 23 are provided in the rear cooling passage 17. In this example, the plurality of lattice structure bodies 23 are disposed so as to be arranged along the height direction H of the turbine rotor blade 1. Partition bodies 27 extending in the cooling medium movement direction M are interposed between the adjacent lattice structure bodies 23.

As shown in FIG. 3, as elements that form a part of the cooling structure for cooling the turbine rotor blade 1, the turbine rotor blade 1 further includes the cooling medium discharge port 25 and an exposed wall portion 29. In a rear end portion of the turbine rotor blade 1, a portion of the second airfoil wall 5, whose wall surface is exposed to the outside (the passage GP for the high-temperature gas) by cutting out the first airfoil wall 3, is formed. The cooling medium discharge port 25 is provided at a downstream side end portion (rear end portion) of the rear cooling passage 17 and discharges the cooling medium CL within the rear cooling passage 17 to the outside. The cooling medium discharge port 25 is formed as a gap between the first wall surface 3a and the second wall surface 5a at a location where the first airfoil wall 3 is cut out as described above. In other words, an exposed wall portion 29 is provided in the form of a portion of the second airfoil wall 5 extending beyond the cooling medium discharge port 25 to the outside. Therefore, a wall surface 29a of the exposed wall portion 29 that faces the first airfoil wall 3 side forms a wall surface that is contiguous from the second wall surface 5a. An outlet 23a of each lattice structure body 23 is located at the cooling medium discharge port 25.

Figure 4:
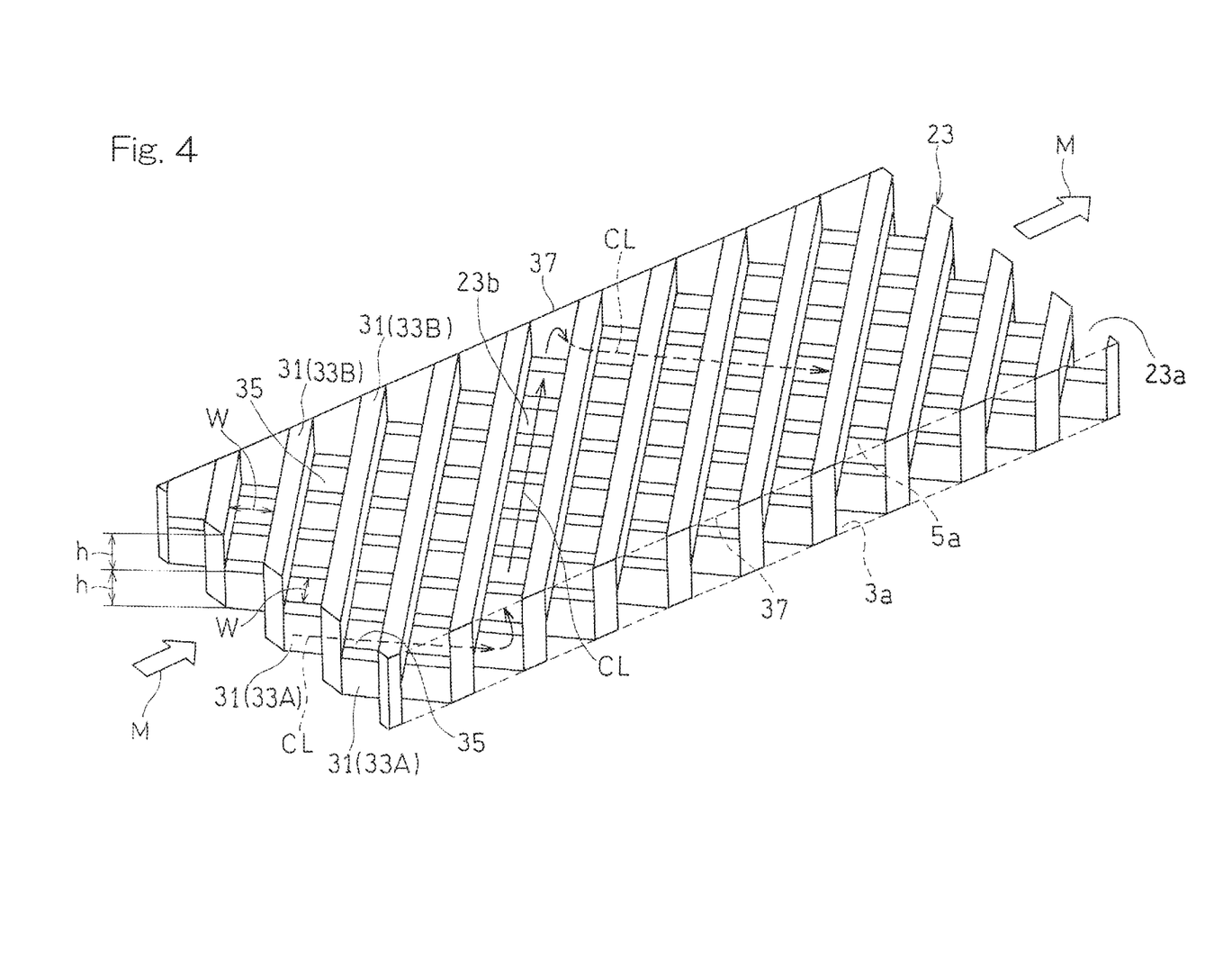
FIG. 4 is a perspective view schematically showing a lattice structure body used in the cooling structure for the turbine airfoil in FIG. 2.

As shown in FIG. 4, the lattice structure body 23 is formed of combination of a plurality of rib sets provided on both wall surfaces 3a and 5a, which face the rear cooling passage 17, each of the rib sets including a plurality of ribs 31 provided at equal intervals so as to be parallel to each other. The lattice body is formed by stacking the rib sets on each other so as to form a lattice pattern. In the present embodiment, the lattice structure body 23 is formed by combining two rib sets, that is, a first rib set (the lower rib set in FIG. 4) 33A and a second rib set (the upper rib set in FIG. 4) 33B, such that the rib sets 33A and 33B are stacked on each other in a height direction of the ribs 31 (a direction in which the first wall surface 3a and the second wall surface 5a face each other) so as to form a lattice pattern. In the lattice structure body 23, the gap between the adjacent ribs 31, 31 of each rib set 33A, 33B form a passage (lattice passage) 35 for the cooling medium CL. In the rear cooling passage 17, the lattice structure body 23 is placed between two side walls 37, 37, which extend in the cooling medium movement direction M, so as to be oriented such that the lattice passages 35 are inclined relative to the cooling medium movement direction M.

The cooling medium CL introduced into the lattice structure body 23 initially flows through the lattice passage 35 of one rib set (the lower first rib set 33A in the shown example) as shown by a broken line arrow in FIG. 4, collides against one side wall 37, is deflected, and flows into the lattice passage 35 of the other rib set (the upper second rib set 33B in the shown example) as shown by a solid line arrow in FIG. 4. The cooling medium CL that has flowed into the lattice passage 35 of the other rib set flows through this lattice passage 35 while gradually forming vortex flow by colliding against the side wall 37 and the wall surface 5a (3a), and then reaches the other side wall 37. After repeating a process of flowing through the lattice passage 35 of one rib set, colliding against the side wall 37, being deflected, flowing into the lattice passage 35 of the other rib set, and passing, as vortex flow, through the lattice passage 35 in the lattice structure body 23 as described above, the cooling medium CL is discharged from the lattice structure body 23. By the cooling medium CL repeating collision against the side wall 37 and the wall surfaces 3a and 5a, vortex flow is generated in the cooling medium CL flowing through the lattice passage 35, whereby cooling is enhanced.

In each lattice structure body 23, also from communication portions 23b each of which is a portion where the lattice passage 35 of the first rib set 33A and the lattice passage 35 of the second rib set 33B communicate with each other (that is, a portion at which the lattice passage 35 of the first rib set 33A and the lattice passage 35 of the second rib set 33B intersect each other in a plan view), the cooling medium CL flows into the mutual lattice passages 35.

In the present embodiment, as shown in FIG. 4, in the lattice structure body 23, the heights of the upper and lower ribs 31, that is, lattice passage heights h in the blade thickness direction, are equal to each other. In addition, the interval between the ribs 31, 31 in the first rib set 33A and the interval between the ribs 31, 31 in the second rib set 33B are equal to each other. That is, a lattice passage width w in the first rib set 33A and a lattice passage width w in the second rib set 33B are equal to each other. The angle formed by the extension direction of the first rib set 33A and the extension direction of the second rib set 33B is set to about 90°. As a matter of course, the arrangement configuration of the plurality of ribs 31 in each rib set is not limited to the shown example, and may be set as appropriate in accordance with the structure of the turbine airfoil, required cooling performance, etc.

As shown in FIG. 2, in the present embodiment, the plurality of (four in the shown example) lattice structure bodies 23, which are separated from each other in the height direction H, by a plurality of (three in the shown example) partition bodies 27 are provided in the rear cooling passage 17. An upper end wall 17a of the rear cooling passage 17, the partition bodies 27, and a lower end wall 17b of the rear cooling passage 17 shown in FIG. 2 correspond to the side walls 37 in FIG. 4. The lattice passages 35 formed in each rib set are closed by the partition bodies 27. In this example, a flat-plate-like partition plate is used as each partition body 27. Any structure body may be used as each partition body 27 as long as it is a structure body that can substantially close the lattice passages 35 of each rib set, that is, a structure body that can obstruct flow of the cooling medium CL between the adjacent lattice structure bodies 23, and the cooling medium CL can be collided against the side portion of the lattice structure body 23 and deflected so as to flow from a lattice passage 35 of one rib set to a lattice passage 35 of the other rib set (FIG. 4). For example, a plurality of pin fins disposed at a position facing the openings of the respective lattice passages at the side portion of the lattice structure body 23 may be used as each partition body 27.

Figure 5:
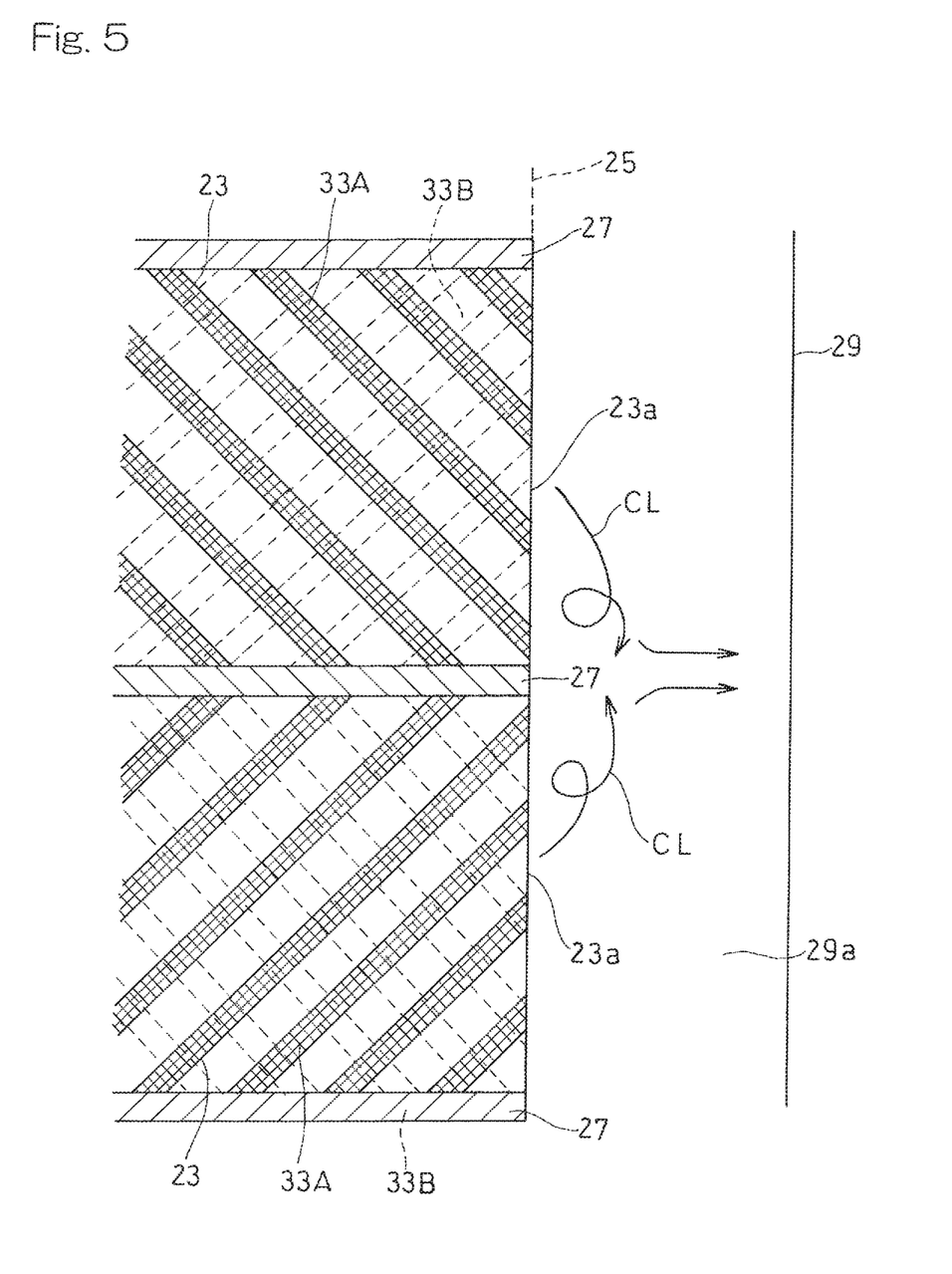
FIG. 5 is a cross-sectional view schematically showing an area around a rear end portion of the turbine airfoil in FIG. 2 in an enlarged manner.

In the present embodiment, as shown in FIG. 5, in the two lattice structure bodies 23, 23 adjacent to each other with the partition body 27 being interposed therebetween, the adjacent two first rib sets 33A, 33A (the rib sets shown by cross-hatching in FIG. 5) and the adjacent two second rib sets 33B, 33B (the rib sets shown by broken lines in FIG. 5)

extend so as to be inclined in opposite directions relative to the partition body 27, respectively. More specifically, the adjacent two first rib sets 33A, 33A and the adjacent two second rib sets 33B, 33B are inclined so as to be symmetrical with respect to the partition body 27, respectively.

For example, the two lattice structure bodies 23, 23 adjacent to each other with the partition body 27 being interposed therebetween, may be configured such that at least respective outlet portions of the two adjacent lattice structure bodies 23, 23, which have the partition body 27 interposed therebetween, have the two first rib sets 33A, 33A and the two second rib sets 33B, 33B, of the two adjacent lattice structure bodies 23, 23, are inclined in opposite directions relative to the partition body 27, respectively, such that the two first rib sets 33A, 33A, of the two adjacent lattice structure bodies 23, 23, are mirrored about the partition body 27 and the two second rib sets 33B, 33B, of the two adjacent lattice structure bodies 23, 23, are mirrored about the partition body 27.

Additionally, the direction of extension of the ribs 31 of the first rib set 33A of each of a plurality of lattice structure bodies is opposite to the direction of extension of the ribs 31 of each of adjacent lattice structure bodies of the plurality of lattice structure bodies, and the direction of extension of the ribs 31 of the second rib set 33B of each of the plurality of lattice structure bodies is opposite to the direction of extension of the second ribs 31 of each of adjacent lattice structure bodies of the plurality of lattice structure bodies.

As shown in FIG. 5, the cooling medium CL discharged from each lattice structure body 23 forms vortex flow. In the present embodiment, since the two lattice structure bodies 23, 23 adjacent to each other across the partition body 27 are arranged such that the respective rib sets thereof are inclined so as to be symmetrical with respect to the partition body 27, the cooling media CL discharged from both lattice structure bodies 23, 23 form vortex flows in directions opposite to each other. Therefore, the vortex flows in the opposite directions in those cooling media CL interfere with each other to thereby cancel each other. As a result, the cooling medium CL whose flow direction has been made uniform is discharged to the exposed wall portion 29, and film cooling of the wall surface 29a of the exposed wall portion 29 is effectively performed by the cooling medium CL.

As a matter of course, the adjacent two first rib sets and the adjacent two second rib sets do not need to be inclined so as to be symmetrical with respect to the partition body 27, and the effect that the vortex flows of the cooling media CL discharged from the adjacent lattice structure bodies cancel each other can be obtained as long as the adjacent two first rib sets and the adjacent two second rib sets are inclined in directions opposite to each other relative to the partition body 27. For example, the positions of the ribs of the adjacent lattice structure bodies 23, 23 may be displaced relative to the cooling medium movement direction M, and the inclination angles of the ribs of the adjacent lattice structure bodies 23, 23 relative to the partition body 27 may be different from each other.

Moreover, as shown in FIG. 2, in the present embodiment, over all the lattice structure bodies 23, the adjacent two first rib sets and the adjacent two second rib sets are inclined in opposite directions relative to the partition body 27, respectively. As a matter of course, it is sufficient that, at at least the outlet 23a portion of each lattice structure body 23, the adjacent two first rib sets and the adjacent two second rib sets are inclined in opposite directions relative to the partition body 27, respectively.

In the present embodiment, as shown in FIG. 4, in each of the first rib set 33A and the second rib set 33B, each of the ribs between both side walls 37, 37 (between the upper end wall 17a and the partition body 27, between the two partition bodies 27, 27, and between the partition body 27 and the lower end wall 17b in FIG. 2) is provided to extend such that a plurality of communication portions 23b are formed between the two lattice communication portions 23b at both end portions of the rib. By such configuration, a distance sufficient to form vortex flow and cool the wall surfaces of the lattice passages 35 until the cooling medium CL that has been deflected at one side wall 37 reaches the other side wall 37, is ensured. As a matter of course, the extension length of each rib in each lattice structure body 23 is not limited thereto.

In the present embodiment, as shown in FIG. 3, the outlet 23a of each lattice structure body 23 is located at the cooling medium discharge port 25. In other words, each lattice structure body 23 is provided to the rear end of the rear cooling passage 17. Accordingly, after the entirety of the interior of the rear cooling passage 17 is effectively cooled by the lattice structure bodies 23, film cooling of the rear end portion of the turbine airfoil can be performed by uniform flow of the cooling medium CL. Thus, it is possible to further enhance the cooling efficiency for the entirety of the turbine airfoil. As a matter of course, the outlet 23a of each lattice structure body 23 may be located at the front side with respect to the cooling medium discharge port 25.

Moreover, in the present embodiment, since the cooling medium movement direction M is the chord direction as shown in FIG. 2, the exposed wall portion 29 can assuredly have a sufficient dimension in the height direction H of the turbine airfoil, and thus the cooling efficiency for the entirety of the turbine airfoil can be further enhanced. As a matter of course, the cooling medium movement direction M is not limited to the chord direction, and the arrangement of the lattice structure bodies 23, the cooling medium discharge port 25, and the exposed wall portion 29 may be set as appropriate in accordance with the cooling medium movement direction M.

Figure 6:
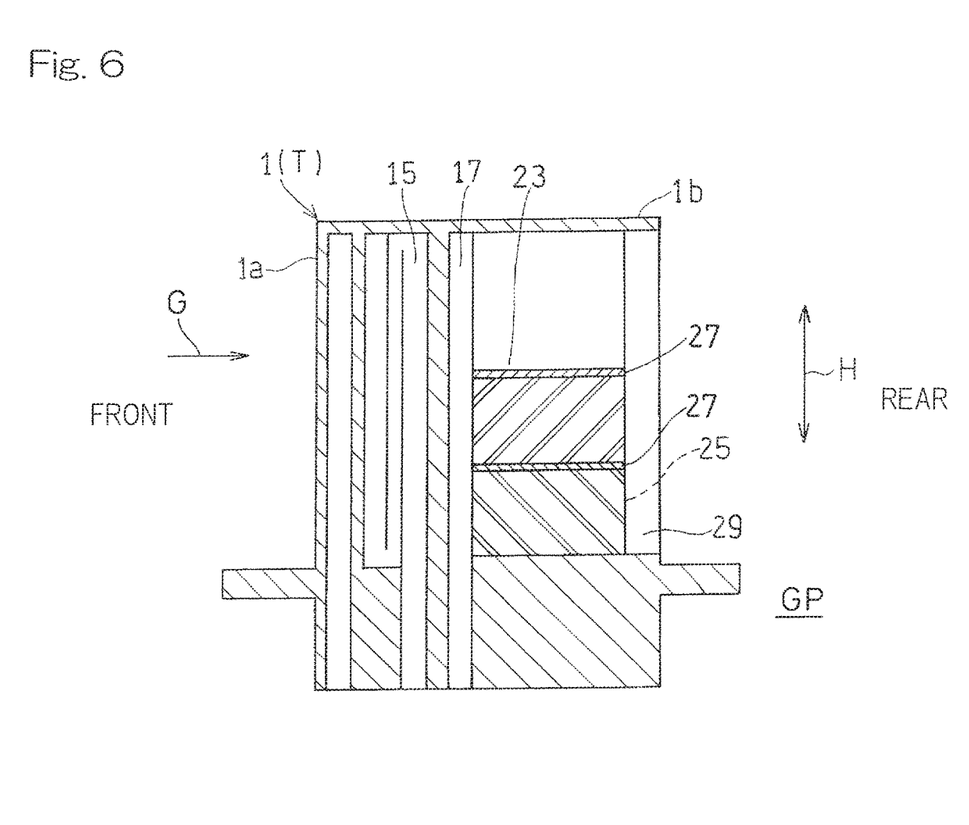
FIG. 6 is a longitudinal cross-sectional view schematically showing an example of arrangement of the cooling structure for the turbine airfoil according to the embodiment of the present invention.

In the shown example, the lattice structure bodies 23 are provided over substantially the entirety in the height direction H (the radial direction of the turbine) of the turbine rotor blade 1, but lattice structure bodies 23 may be provided only in a part in the height direction H of the turbine rotor blade 1. For example, as shown in FIG. 6, lattice structure bodies 23 may be provided only at the base side of the turbine rotor blade 1 (in a half region at the base side in the shown example), that is, at the radially inner side. Accordingly, a base portion of the turbine rotor blade 1 for which the necessity for cooling is relatively high since the base portion is a portion to which great stress is applied can be effectively cooled. For the same reason, in the case where lattice structure bodies 23 are provided to a turbine stator vane, the lattice structure bodies 23 may be provided only at the base side of the turbine stator vane that is the radially outer side of the turbine.

As described above, in the cooling structure according to the present embodiment, the cooling media CL that have been discharged from the adjacent lattice structure bodies 23, 23 and have formed vortex flows in opposite directions interfere with each other, whereby the vortex flows cancel each other and the cooling medium CL is straightened to flow in a uniform direction and then discharged from the cooling medium discharge port 25 to the exposed wall portion 29. Accordingly, the high-temperature gas G and the cooling medium CL are inhibited from being mixed together at the exposed wall portion 29, and a sufficient film cooling effect is obtained. Therefore, both cooling of the interior of the turbine airfoil by the lattice structure body 23 and film cooling of the turbine airfoil rear edge portion can be achieved with high efficiency, and thus it is possible to enhance the cooling efficiency for the entirety of the turbine airfoil.

Although the present invention has been described above in connection with the embodiments thereof with reference to the accompanying drawings, numerous additions, changes, or deletions can be made without departing from the gist of the present invention. Accordingly, such additions, changes, or deletions are to be construed as included in the scope of the present invention.

REFERENCE NUMERALS

1 . . . Turbine rotor blade (Turbine airfoil)
3 . . . First airfoil wall
5 . . . Second airfoil wall
17 . . . Rear cooling passage (Cooling passage)
23 . . . Lattice structure body
23a . . . Outlet of lattice structure body
25 . . . Cooling medium discharge port
27 . . . Partition body
29 . . . Exposed wall portion
CL . . . Cooling medium
G . . . High-temperature gas
GP . . . Passage for high-temperature gas

What is claimed is:

1. A cooling structure for cooling a turbine airfoil of a turbine driven by a high-temperature gas, the cooling structure comprising:
   a cooling passage formed between a first airfoil wall of the turbine airfoil, the first airfoil wall being curved so as to be concave relative to a passage for the high-temperature gas, and a second airfoil wall of the turbine airfoil, the second airfoil wall being curved so as to be convex relative to the passage for the high-temperature gas;
   a plurality of lattice structure bodies each including a first rib set composed of a plurality of first ribs extending linearly and parallel to each other and provided on a wall surface of the first airfoil wall that faces the cooling passage, and a second rib set composed of a plurality of second ribs extending linearly and parallel to each other, in a direction opposite to the direction in which the plurality of first ribs extend, and which are provided on a wall surface of the second wall that faces the cooling passage, the second rib set being stacked on the first rib set so as to form a lattice pattern;
   at least one partition body configured such that a partition body of the at least one partition body is disposed between each of adjacent lattice structure bodies of the plurality of lattice structure bodies, the partition body being configured to close a passage formed in each rib set of each adjacent lattice structure body;
   a cooling medium discharge port provided at a downstream end portion of the cooling passage and configured to discharge a cooling medium within the cooling passage to the outside of the turbine airfoil; and
   an exposed wall portion in the form of a portion of the second airfoil wall which extends beyond the cooling medium discharge port to the outside;
   wherein the direction of extension of the plurality of first ribs of the first rib set of each of the plurality of lattice structure bodies is opposite to the direction of extension of the plurality of first ribs of each of adjacent lattice structure bodies of the plurality of lattice structure bodies, and
   wherein the direction of extension of the plurality of second ribs of the second rib set of each of the plurality of lattice structure bodies is opposite to the direction of extension of the plurality of second ribs of each of adjacent lattice structure bodies of the plurality of lattice structure bodies at at least respective outlet portions of the plurality of the lattice structure bodies.

2. The cooling structure as claimed in claim 1, wherein, at least the respective outlet portions of two adjacent lattice structure bodies of the plurality of lattice structure bodies, having a partition body of the at least one partition body interposed therebetween, are configured such that one of the two first rib sets and the other of the two first rib sets, of the two adjacent lattice structure bodies, are inclined so as to be symmetrical with respect to the partition body, and the two second rib sets, of the two adjacent lattice structure bodies, are inclined so as to be symmetrical with respect to the partition body.

3. The cooling structure as claimed in claim 1, wherein an outlet of each lattice structure body is located at the cooling medium discharge port.

4. The cooling structure as claimed in claim 1, wherein a movement direction of the entirety of the cooling medium is in a direction along a chord of the turbine airfoil, and the plurality of the lattice structure bodies are disposed so as to be arranged along a height direction of the turbine airfoil with the partition body being interposed therebetween.

* * * * *